United States Patent [19]

Olsen et al.

[11] Patent Number: 5,705,288

[45] Date of Patent: Jan. 6, 1998

[54] PROCESS FOR GENERATING ELECTRICAL ENERGY IN A HIGH TEMPERATURE FUEL CELL

[75] Inventors: Christian Olsen, Lyngby; Jens Rostrup Nielsen, Virum; Kim Aasberg-Petersen, Holte, all of Denmark

[73] Assignee: Haldor Topsoe A/S, Lyngby, Denmark

[21] Appl. No.: 619,833

[22] Filed: Mar. 19, 1996

[30] Foreign Application Priority Data

Mar. 20, 1995 [DK] Denmark ................................. 0283/95

[51] Int. Cl.$^6$ .................................................. H01M 8/06
[52] U.S. Cl. ............................................................ 429/17
[58] Field of Search .............................. 429/19, 20, 16, 429/17, 34, 40, 41

[56] References Cited

U.S. PATENT DOCUMENTS

| | | | |
|---|---|---|---|
| 4,810,595 | 3/1989 | Kahara et al. | 429/16 |
| 4,898,792 | 2/1990 | Singh et al. | 429/19 |
| 5,246,791 | 9/1993 | Fisher et al. | 429/16 |
| 5,527,631 | 6/1996 | Singh et al. | 429/20 |

*Primary Examiner*—M. Nuzzolillo
*Attorney, Agent, or Firm*—Ostrolenk, Faber, Gerb & Soffen, LLP

[57] ABSTRACT

Process for the generation of electrical energy in an internal reforming high temperature fuel cell, comprising steam and/or carbon dioxide reforming of a hydrocarbon feed gas in contact with a catalyst having activity in the steam reforming of the carbonaceous gas to fuel cell fuel gas and being arranged within the fuel cell in heat conducting relationship with electrochemical reactions proceeding in the cell; and electrochemically reacting the fuel gas in an anode compartment of the cell for the generation of electric energy, wherein the steam reforming activity of the catalyst has been reduced by including one or more salts of metals selected from Group IA, IB, IIA, IVA and VA of the Periodic Table in the catalyst.

6 Claims, 4 Drawing Sheets

—■— RKN
—+— RKN/Na
—✱— RKN/K

PROCESS FOR GENERATING ELECTRICAL ENERGY IN A HIGH TEMPERATURE FUEL CELL

BACKGROUND OF THE INVENTION

The invention is directed to a method of producing electrical energy in a high temperature fuel cell with direct or indirect internal reforming, and, more particular, to certain improvements in the operation of such a cell by employing a partly passivated steam reforming catalyst for the internal reforming of a carbonaceous feed gas.

High temperature fuel cells, such as molten carbonate fuel cells, comprise usually an electrolyte sandwiched between an anode and a cathode. In the molten carbonate fuel cell, the electrolyte consists mainly of a mixture of alkali and alkaline earth metal carbonates.

At the anode, carbonate ions, which are formed at the cathode and transported through the electrolyte, react with fuel cell process gas mainly consisting of hydrogen to form water and carbon dioxide and liberating electrons according to the reaction:

$$H_2 + CO_3^- \rightarrow H_2O + CO_2 + 2e^- \quad (1)$$

The electrons liberated at the anode are through an external circuit conducted to the cathode, where the electrons react with oxygen and carbon dioxide to form carbonate ions according to the reaction:

$$\tfrac{1}{2}O_2 + CO_2 + 2e^- \rightarrow CO_3^- \quad (2)$$

The above electrochemical reactions are in a conventionally designed molten temperature fuel cell usually performed at temperatures between 500° C. and 800° C.

The high operating temperature of e.g. the molten carbonate fuel cell makes it very suitable for internal reforming of carbonaceous feed gas, e.g. methane, to anode fuel gas.

During internal reforming, the carbonaceous feed gas are mixed with steam and/or carbon dioxide and reformed within the fuel cell by the following endothermic reactions:

$$C_nH_m + nH_2O \rightarrow nCO + (\tfrac{1}{2}m+n)H_2 \quad (3)$$

$$C_nH_m + nCO_2 \rightarrow 2nCO + (\tfrac{1}{2}m)H_2 \quad (4)$$

The carbon monoxide may further react with steam according to the exothermic shift reaction:

$$CO + H_2O \rightarrow CO_2 + H_2 \quad (5)$$

The reforming reactions (3) and (4) and the shift reaction (5) are carried out by contacting the gas with a specific steam reforming catalyst of Group VIII metals including nickel and ruthenium supported on a refractory carrier material arranged internally within the cell in heat conducting relationship with the electrochemical reactions in the cell.

Thereby, necessary heat for the above endothermic reactions (3) and (4) are supplied by excess heat produced by the above exothermic electrochemical reactions (1) and (2). As an advantage of such a fuel cell, the requirement for external reforming is eliminated or reduced, and, thus, the efficiency of the fuel cell increased.

However, internal reforming in a molten temperature fuel cell is problematic.

As known in the art, the internal reforming catalyst is subjected to poisoning by alkaline compounds from the electrolyte, which results in considerable loss of catalytic activity.

Poisoning of the catalyst with alkaline compounds and reduction of the catalytic activity is a function of the operating time of the fuel cell. Because of decreasing catalytic activity, the amount of catalyst used in the fuel cell is usually adapted to the required catalytic activity at the end of the fuel cell lifetime.

As a consequence, the catalytic activity in the fuel cell is in the first period of the its lifetime much higher than required. The cell is, therefore, cooled excessively at the anode inlet due to the endothermic reforming reaction (3) and (4). Excessive cooling in this region leads to severe temperature gradients within the fuel cell, which reduce performance and lifetime of the fuel cell caused by i.a. thermic stress in cell unit materials.

SUMMARY OF THE INVENTION

It has now been found that the temperature profile within an internal reforming high temperature fuel cell can be advantageously improved by operating the cell with a passivated internal reforming catalyst. Thereby, the temperature profile in the fuel cell is smoothed during the first period of its lifetime and the fuel cell lifetime advantageously prolonged. Additionally, reduction of catalyst activity by poisoning with alkaline compounds has lower impact on passivated catalysts than on non-passivated catalysts. Thus, the activity of the passivated catalyst is at the end of the fuel cell lifetime sufficiently high to ensure the desired conversion of the hydrocarbon in the fuel gas.

Accordingly, this invention provides a process for the generation of electrical energy in an internal reforming high temperature fuel cell, comprising steam and/or carbon dioxide reforming of a carbonaceous gas in contact with a catalyst having activity in the steam reforming of the carbonaceous gas to fuel cell fuel gas and being arranged within the fuel cell in heat conducting relationship with electrochemical reactions proceeding in the cell; and electrochemically reacting the fuel gas in an anode compartment of the cell for the generation of electrical energy, wherein the steam reforming activity of the catalyst has been reduced by including one or more compounds of metals selected from Group IA, IB, IIA, IVA and VA of the Periodic Table in the catalyst.

Steam reforming catalysts useful in the above process are any of the catalysts having steam reforming activity, including the known nickel and/or ruthenium containing catalysts.

Inclusion of Group I and/or Group II metals in the steam reforming catalyst reduces the steam reforming activity of the catalyst. The rate of the endothermic steam reforming reactions (2) and (3), and, accordingly, the temperature drop caused by the steam reforming reactions is considerably lower by use of the passivated catalysts.

Depending on the desired final catalytic activity of the steam reforming catalyst and the maximum tolerable temperature drop at the inlet to the anode chamber, the catalyst will typically be passivated by inclusion of between 0.1% and 10% by weight with the above metals calculated from their metal form.

The metals may be included in the catalyst by impregnation with an aqueous solution of salts of the metals, such as hydroxide carbonates and nitrates, or coprecipitation of the main catalytic ingredients with Group I and/or Group II metal compounds.

Using a molten carbonate fuel cell in the above process, preferred metals for passivating the steam reforming catalyst are sodium, lithium and/or potassium in form of their carbonates.

The impact of partly passivating the catalyst on the temperature is, furthermore, illustrated by the following computation models, which illustrate the calculated temperature profile in a fuel cell using a partly passivated steam reforming compared to an unpassivated catalyst.

EXAMPLE

In the Example, a conventional steam reforming catalyst with Ni on MgO (comparison catalyst commercial available from Haldor Topsøe A/S, Denmark under the tradename RKNR) and different catalysts according to the invention, which are passivated forms of the conventional Ni steam reforming catalyst with Na, K, Cu salt. The catalysts have been prepared by impregnation of the Ni-catalyst with 1.6 wt % $Na_2CO_3$, 2 wt % $K_2CO_3$ and 2 wt % $Cu(NO_3)_2$, respectively, have been aged in a reactor at 650° C. in a mixture of $H_2$ and $H_2O$ for 72 hours. The activity of each catalyst was then determined as a function of runtime in a reactor, in which a fuel gas consisting of 200 Nl/h $H_2O$
5 Nl/h $CO_2$
20 Nl/h $H_2$
50 Nl/h $CH_4$ was passed at an inlet temperature of 650°–675° C. through an electrolyte bed $(K_{0.38}Li_{0.02})_2CO_3$ in a porous $LiAlO_2$ matrix, and, subsequently, over the catalyst. The relative loss in activity versus time for the three catalysts are shown in FIG. 1, where (■) refers to the conventional catalyst, (+) to the $Na_2CO_3$ passivated catalyst and (*) to the $K_2CO_3$ passivated catalyst.

Figure 1:
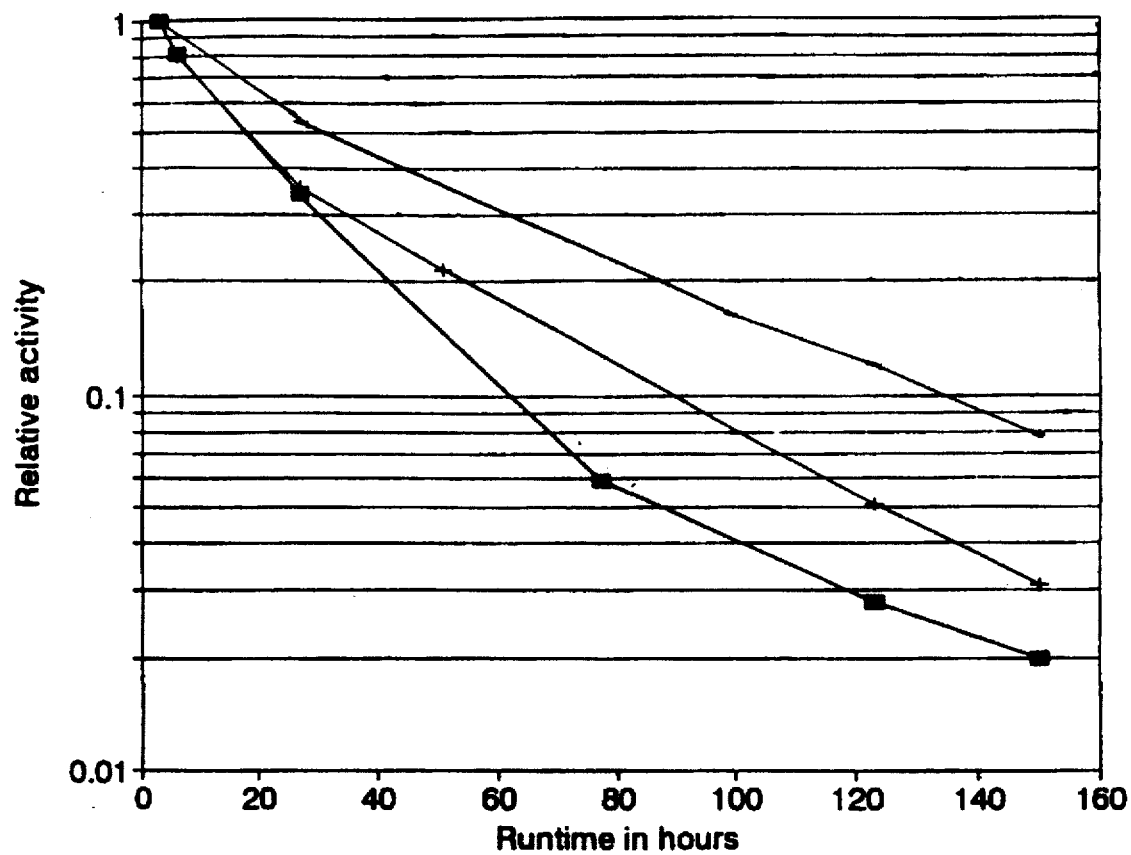
FIGS. 1, 2 and 3 are plots of steam reforming activity of both catalysts of the invention and the comparison catalysts against run time.

As seen from FIG. 1, the relative steam reforming activity of the passivated catalyst is considerably higher after an operation time of 160 hours than the relative activity of the comparison catalyst.

Figure 2:
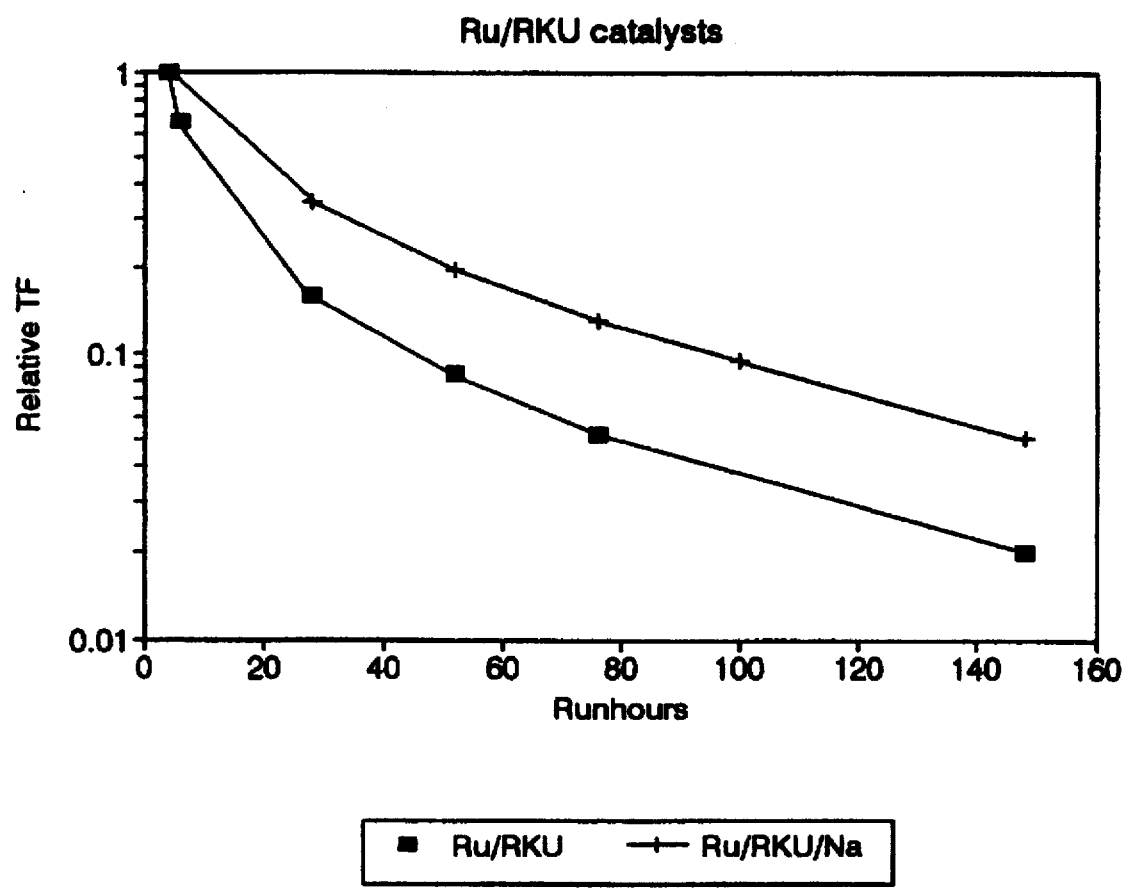
Figure 3:
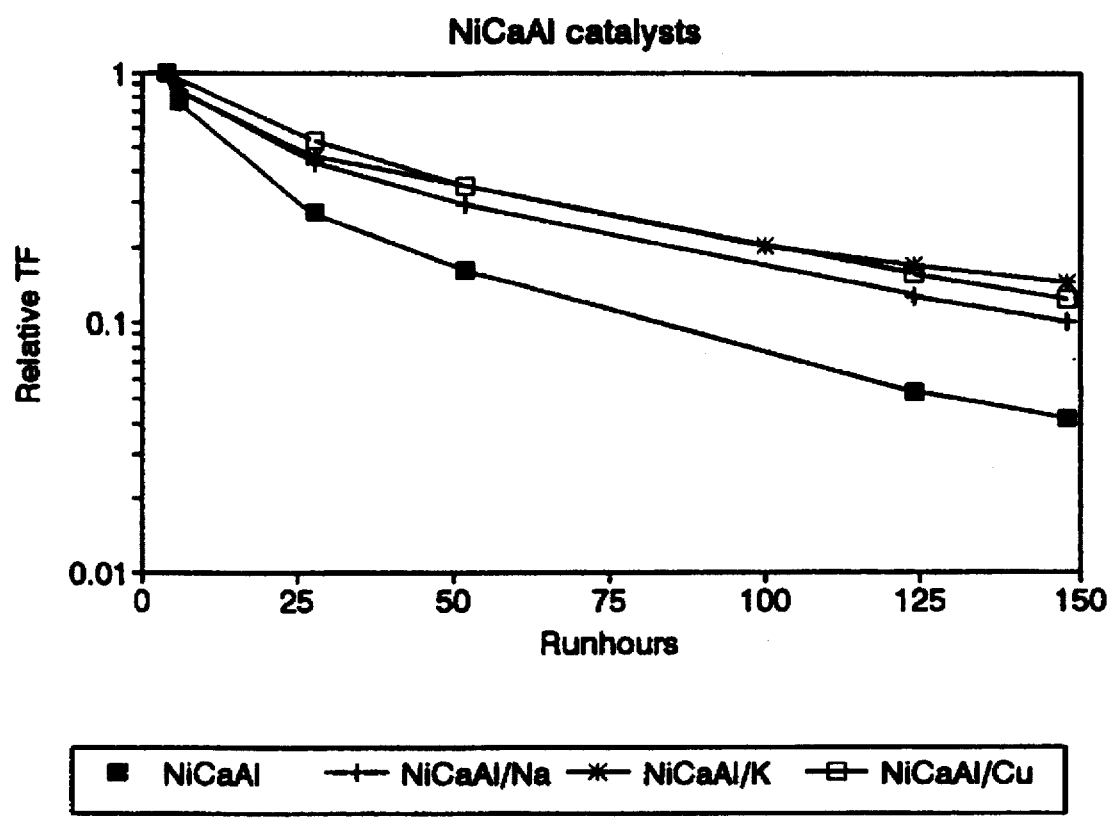

Similar to the above Ni steam reforming catalyst, the activity of ruthenium and nickel/calcium aluminate steam reforming catalysts passivated with the above metal salts show higher relative activity after a certain time on stream than the unpassivated catalysts, as seen from FIG. 2 and 3.

Figure 4:
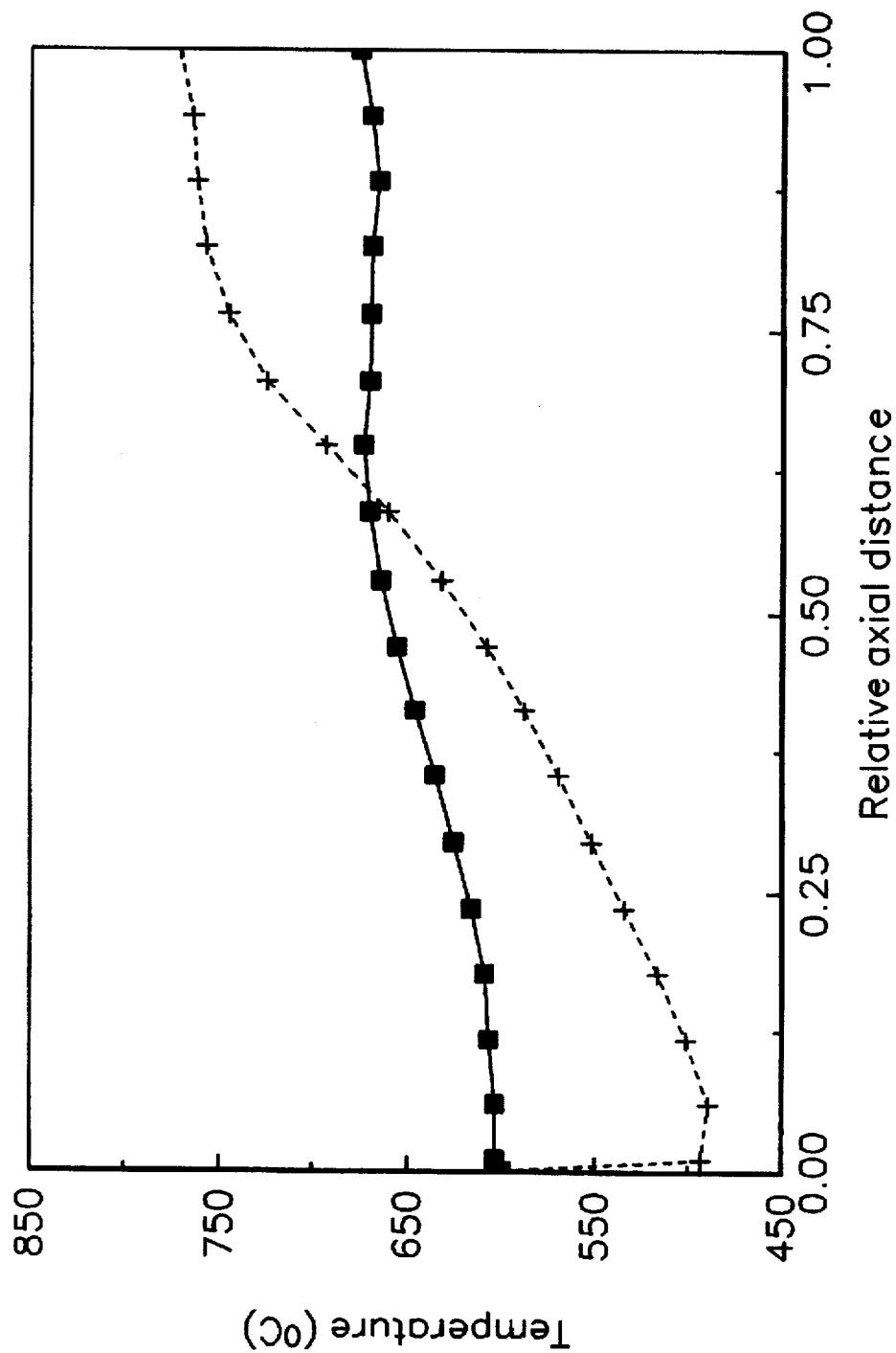
FIG. 4 is a computational model plot of temperature in an internal reforming fuel cell against relatives axial distances in the fuel cell anode compartment for both a catalyst of the invention and the comparison catalyst.

FIG. 4 shows results from a computation model of the temperature profile in an internal reforming fuel cell at a relative axial distance from 0 to 1 in the anode compartment of the fuel cell with a passivated catalyst (■) and the temperature profile obtained with the non-passivated comparison catalyst (+). As seen from FIG. 4, the cell temperature drops abruptly from an inlet temperature of 600° C. to about 500° C. in the inlet region by use of the unpassivated reforming catalyst due to excessive cooling by the reforming reactions proceeding on the unpassivated catalyst at a high rate in the inlet region.

When using the passivated reforming catalyst, a slight temperature increase from an inlet temperature of 600° C. to a maximum temperature of approx. 675° C. is calculated caused by the reduced steam reforming activity of this catalyst.

We claim:

1. Process for the generation of electrical energy in an internal reforming high temperature fuel cell, comprising steam or carbon dioxide reforming of a hydrocarbon feed gas in contact with a catalyst having activity in the steam reforming of the carbonaceous gas to fuel cell fuel gas and being arranged within the fuel cell in heat conducting relationship with electrochemical reactions proceeding the cell; and electrochemically reacting the fuel gas in an anode compartment of the cell for the generation of electric energy, wherein the steam reforming activity of the catalyst has been reduced by including in the catalyst one or more salts of metals selected from the group consisting of $Na_2CO_3$, $Li_2CO_3$, $K_2CO_3$, $Cu(NO_3)_2$, $BaCO_3$ and salts of the metals of Groups IVA and VA of the Periodic Table.

2. The process of claim 1, wherein the high temperature fuel cell is a molten carbonate fuel cell.

3. The process of claim 1 in which said salt is a carbonate or nitrate.

4. The process of claim 1, wherein the steam reforming activity of the catalyst has been reduced by including one or more Group IA salt in the catalyst.

5. The process of claim 3, wherein the Group IA metal salt is a carbonate.

6. The process of claim 4, wherein the high temperature fuel cell is a molten carbonate fuel cell.

\* \* \* \* \*